June 27, 1944. E. D. POWERS ET AL 2,352,447
APPARATUS FOR PRODUCING EDIBLE ARTICLES
Original Filed Sept. 11, 1939   2 Sheets-Sheet 2

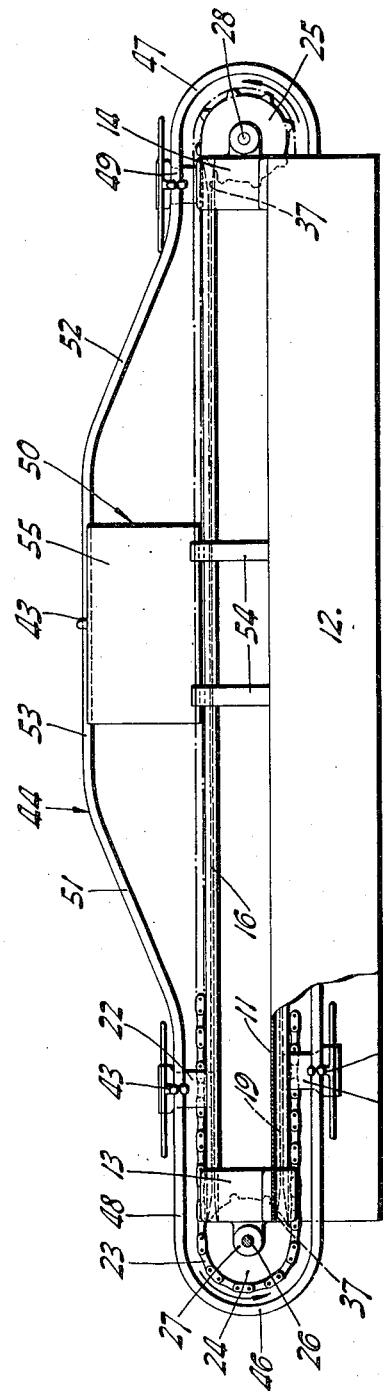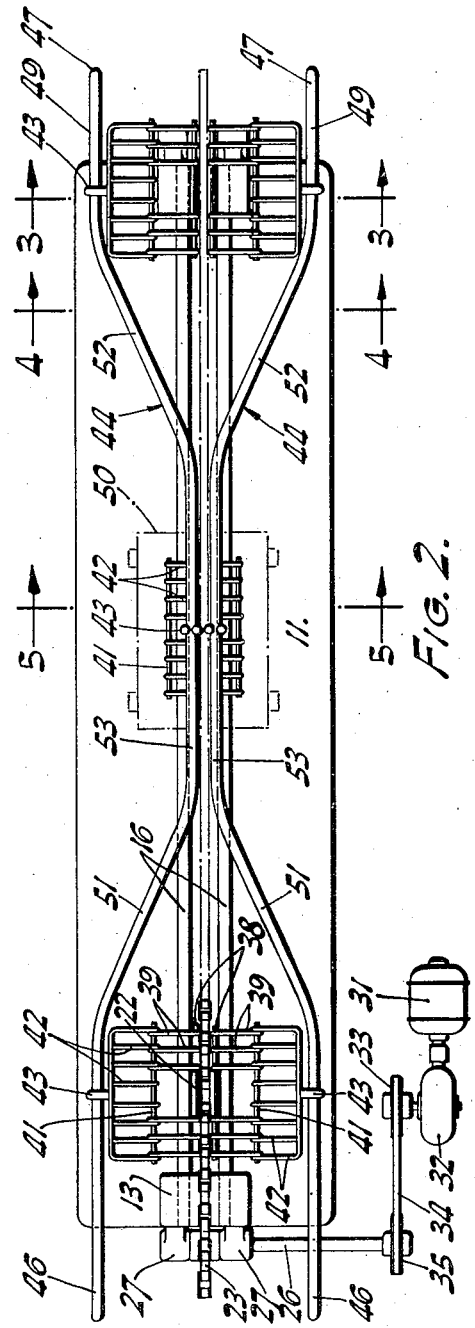

INVENTORS
EDWARD D. POWERS &
ALBERT M. FENNIS
BY
Beau, Brooks, Buckley y Beau.
ATTORNEYS Patented June 27, 1944

2,352,447

UNITED STATES PATENT OFFICE 2,352,447

APPARATUS FOR PRODUCING EDIBLE ARTICLES

Edward D. Powers, Queenston, Ontario, and Albert M. Fennis, Niagara Falls, Ontario, Canada Substituted for abandoned application Serial No. 294,242, September 11, 1939. This application July 18, 1942, Serial No. 451,414

6 Claims. (Cl. 99—386)

This application is a substitute application for applicants' abandoned application Serial No. 294,242, filed September 11, 1939 and the present invention relates to apparatus for producing an edible article, the invention having particular relation to apparatus for making a sandwich formed from a slice of bread and a filler, such as a sausage, for example, by forming the bread around the filler, and while holding it so formed, subjecting it to a toasting operation.

According to the invention a conveyor belt may be provided with a forming device comprising relatively movable sections upon which the slices of bread or the like are placed, with the filler disposed thereupon. Means may be included for effecting relative movement of the sections of the forming device for forming the sliced material around the filler, and for then relatively moving the forming device into operative relation to a toasting device wherein the sliced material may be toasted. The toasting may be continued until the sliced material assumes a rather rigid condition and thus retains the shape imparted to it by the forming device after its removal therefrom.

These and other objects and advantages will become apparent from the following description of the typical embodiments of the apparatus and articles of the invention shown in the accompanying drawings, wherein:

Fig. 1 is a side elevational view of forming and toasting apparatus with parts thereof broken away;

Fig. 2 is a plan view of the apparatus shown in Fig. 1;

Figure 3:
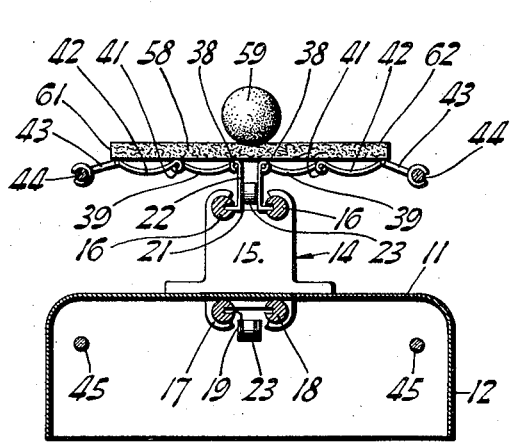
Figure 4:
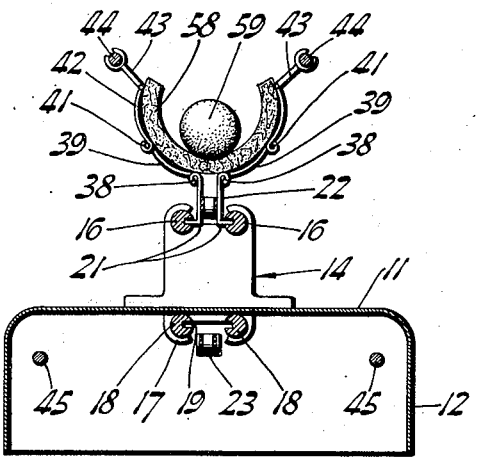
Figure 6:
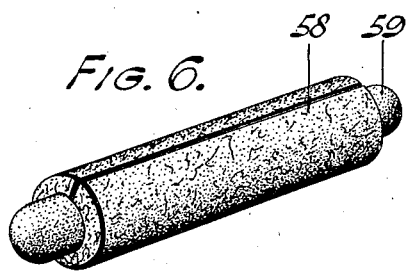
Figure 5:
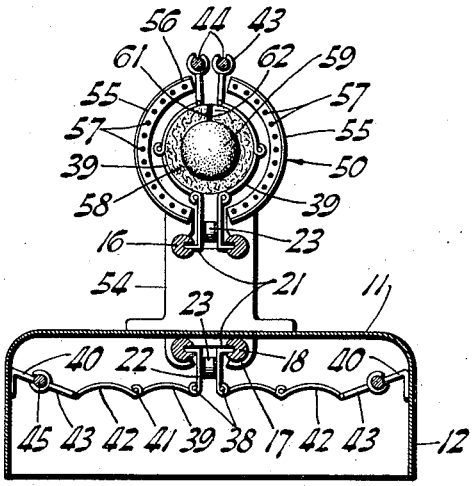
Figure 8:
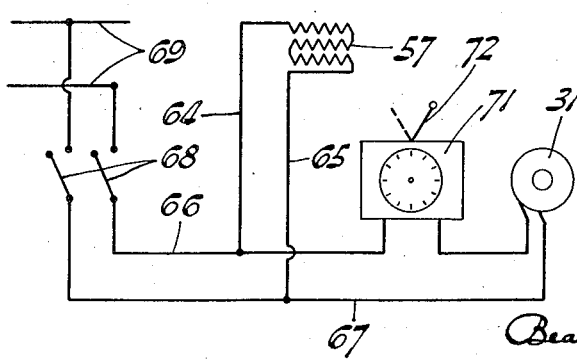
Figure 7:
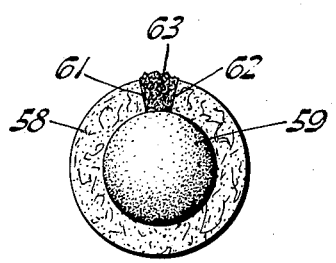

Figs. 3, 4 and 5 are cross sectional views taken in the planes indicated on Fig. 2 by the lines 3—3, 4—4 and 5—5, respectively;

Fig. 6 is a perspective view of one form of the toasted sandwich;

Fig. 7 is an end view of a modified form of sandwich; and,

Fig. 8 is a wiring diagram illustrating an electrical circuit employed in the apparatus.

The apparatus may include a base having a horizontal web 11 and supporting flanges 12. Mounted on the web, at the ends thereof, are brackets 13 and 14, each having an upstanding portion 15 supporting parallel rails 16 above web 11 and a depending portion 17 supporting parallel rails 18 beneath web 11. The rails serve as track means for carriages 22 which have tongues 21 slidingly received in channels 19 formed in the rails and extending lengthwise thereof.

The carriages, upon which the forming devices are mounted and a plurality of which are provided, are secured to an endless belt or chain 23 carried by sprocket wheels 24 and 25. Sprocket wheel 24 is mounted on a shaft 26 which is journaled in bearings 27 extended from bracket 13 while sprocket wheel 25 is mounted on a shaft 28 journaled in bearings 29 formed on bracket 14.

Shaft 26 may be driven by any suitable means, those shown in the drawings consisting of a motor 31, a reduction gear unit 32, drive pulley 33 on the driven shaft of the gear unit, and an endless belt 34 driven by pulley 33 and driving a pulley 35 fixed to the shaft 26. As the latter rotates, moving the endless chain 23 over sprockets 24 and 25 in the direction indicated by arrows in Fig. 1, the carriages 22 will move along track rails 16, around sprocket 24, along track rails 18 and then around sprocket 25, returning to track rails 16. In order to enable the tongues 21 to enter into the ends of the channels 19 in the rails 16 and 18, the mouths of the channels are preferably widened as indicated at 37 in Fig. 1.

Pivoted at 38 to each side of each carriage 22 is a grille section 39 which, in the illustrated embodiment, is composed of heavy wire. Pivoted at 41 to the free or outer edges of inner sections 39 are outer grille sections 42 of form similar to sections 39 but having secured to their outer or free edges fingers 43 having terminal portions slidingly embracing guide rods 44. Each of the latter consists of a bottom portion 45 supported by brackets 40 and extending along and beneath web 11, parallel to track rails 18, the bottom portions merging into curved portions 46 and 47 whose axes of curvature are substantially concentric with shafts 26 and 29, respectively. The curved portions 46 and 47 of guide rods 45 merge respectively into portions 48 and 49 which are parallel to track rails 16.

The inner ends of guide rod portions 48 and 49 terminate in upwardly inclined converging portions 51 and 52 which are connected by portions 53. The latter portions parallel rails 16 but are spaced farther from the latter and are disposed closer to each other than are portions 48 or portions 49.

Supported upon standards 54, which may also support the central portions of rails 16, is a toasting device 50 which may consist of two substantially semi-cylindrical casing sections 55 supporting insulators 56 upon which are mounted electrical resistance elements 57, adapted to become highly heated by passage therethrough of an electric current.

In operation a slice of bread 58 may be placed upon the grille sections 39 and 42 of the carriage 22 which is adjacent portions 49 of guide rods 44 (in the position of the carriage illustrated in Fig. 3), and a suitable sandwich filler, such as a sausage 59, may be placed upon the bread. Upon operation of the motor 31 the carriage will move to the left, as the apparatus is viewed in Figs. 1 and 2, and as it does so the fingers 43 on the outer grille sections 42 pass from portion 49 of rods 44 onto the upwardly inclined and converging portions 52, causing sections 39 and 42 to pivot about their axes 38 and 41 into partially closed position, and forming the slice of bread into the shape indicated in Fig. 4.

As the movement of the carriage continues, fingers 43 will be brought closer and closer together until they pass onto portions 53 of rods 44. At this time the slice of bread will be formed into a cylindrical shell around the filler 59, its opposite side edges 61 and 62 having been brought into adjacency by the sections 39, 42, and the sections 39 and 42 will constitute a substantially tubular grille around the bread. While in this condition the sandwich will pass through the toasting device 50 wherein the bread may be toasted to the desired degree.

As shown in Fig. 5, while the sandwich is in the toasting device the bread 58, carriage grille sections 39 and 42, and the walls and heating elements 57 of the toasting device may all be substantially concentric as illustrated, or may be slightly eccentric, so that uniform toasting of the bread will result.

As movement of the carriage is continued, fingers 43, as they pass over rod portions 51, will open the sections 39, 42, and when the fingers reach rod portions 48 the sections will be in fully opened, substantially horizontal position so that the toasted sandwich may be removed; or, when the carriages 22 pass around the sprocket 24, inclining the opened grille sections, the sandwiches may be automatically discharged therefrom, being collected in a suitable container, without necessity of being handled by the operator. The toasting operation will have transformed the bread into toast, and the latter, being relatively rigid, will retain the tubular form into which it was folded by the grille sections, the finished sandwich being substantially as illustrated in Fig. 6.

By using slices of bread of slightly lesser width than that used to produce the sandwich shown in Fig. 6, the sandwich shown in Fig. 7 may be produced, space thus being provided between edges 61 and 62 for relish 63 or the like material.

The motor 31 and toasting device 50 may be connected to any suitable source of electrical energy and controlled by various means, either manual or automatic, as for example, by time or temperature responsive means. In the illustrated arrangement shown in Fig. 8 the resistance element 57 of the toasting device is connected in parallel by wires 64 and 65 to suitable lead wires 66 and 67 across which the motor 31 is connected and which are connected through a switch 68 to a source of electrical energy by wires 69. In series with motor 31 is a time controlled switch 71 with manual control lever 72.

With this arrangement, the apparatus may be set into operation by closing switch 68, which will cause the heating element 57 to become heated, and, subject to control of time switch 71, will cause the motor 31 to become energized. The time switch, of any suitable construction, may function to close the motor circuit for a sufficient period of time to move a carriage 22 from a position adjacent guide rod portion 49 (where a slice of bread is placed on the grille sections 39, 42) to a position within the toasting device; to then open the motor circuit for a period of time sufficient to effect the desired degree of toasting; and then to recommence the cycle by closing the motor circuit and causing the next carriage 22 to move from a position adjacent guide rod portion 29 into the toasting device. Or, if desired, the switch 71 may be opened and closed manually by means of lever 72.

It will thus be understood that by the apparatus of the present invention, toasted sandwiches may be produced from ordinary sliced bread and suitable filler, the bread being formed about the filler and then toasted, causing it to retain the substantially tubular shape into which it was formed.

It will be understood further that the apparatus herein illustrated and described is merely illustrative of the inventive principles involved and that the same principles may be otherwise embodied without departing from the spirit of the invention or the scope of the appended claims.

What is claimed is:

1. In apparatus of the class described, a forming device of substantially tubular form, the body of said forming device comprising a plurality of sections having articulated connection to each other whereby said forming device may be opened to receive a slice of toastable edible material and closed to bend said slice to substantially tubular form, the body of said forming device comprising a relatively open framework whereby the major portion of the exterior surface of the slice is exposed therethrough and a toasting device adapted to receive said forming device for toasting a tubular slice contained therein.

2. In apparatus of the class described, a track, an openwork grille adapted to receive a slice of toastable edible material and means for moving said grille along said track, said grille comprising a plurality of sections hinged together, means for folding said sections of the grille to dispose said slice into substantially tubular form as the grille moves along the track, and a toasting device through while the grille passes with the sections thereof so folded.

3. In apparatus of the class described, a track, a carriage movable upon the track, said carriage having an openwork grille comprising a plurality of hinged sections, and means operable by and upon movement of the carriage along the track for folding said sections to shape into substantially tubular form a slice of bread that is carried thereby.

4. In apparatus of the class described, a forming device adapted to receive a slice of toastable edible material, guide means for said forming device and means for moving the latter along said guide means, means for changing the shape of said forming device as it is moved along said guide means to bend said slice into predetermined form while leaving the surface thereof exposed, and means for toasting the exposed surface of said slice while the latter is held bent in the forming device whereby said toasted slice retains its bent form after removal from the apparatus.

5. In apparatus of the class described, a carriage and guide means along which said carriage is movable, said carriage having a forming surface adapted to receive a slice of bread, and means operable by and upon movement of the carriage upon the guide means for changing the shape of said forming surface to bend the slice of bread carried thereby into substantially tubular form.

6. In apparatus of the class described, an endless track, a carriage movable upon the track, said carriage having an openwork grille comprising a plurality of hinged sections, a toasting device along said track and through which the grille may pass, and means for effecting hinging movement of said sections to close them into substantially tubular form as they approach said toasting device and to open them as they pass beyond said toasting device.

EDWARD D. POWERS.
ALBERT M. FENNIS.

CERTIFICATE OF CORRECTION.

Patent No. 2,352,447. June 27, 1944.

EDWARD D. POWERS, ET AL.

It is hereby certified that error appears in the printed specification of the above numbered patent requiring correction as follows: Page 2, second column, line 53, claim 2, for the word "while" read --which--; and that the said Letters Patent should be read with this correction therein that the same may conform to the record of the case in the Patent Office.

Signed and sealed this 15th day of August, A. D. 1944.

Leslie Frazer (Seal)

Acting Commissioner of Patents.